United States Patent
Dwiggins (10) Patent No.: US 10,654,244 B2
(45) Date of Patent: May 19, 2020

(54) LAMINATED MULTI-PLY TISSUE PRODUCTS WITH IMPROVED SOFTNESS AND PLY BONDING

(71) Applicant: GPCP IP Holdings LLC, Atlanta, GA (US)

(72) Inventor: John H. Dwiggins, Neenah, WI (US)

(73) Assignee: GPCP IP Holdings LLC, Atlanta, GA (US)

(*) Notice: Subject to any disclaimer, the term of this patent is extended or adjusted under 35 U.S.C. 154(b) by 88 days.

(21) Appl. No.: 15/696,771

(22) Filed: Sep. 6, 2017

(65) Prior Publication Data
US 2018/0104928 A1 Apr. 19, 2018

Related U.S. Application Data (60) Provisional application No. 62/408,380, filed on Oct. 14, 2016.

(51) Int. Cl.
| | | |
|---|---|---|
| B32B 3/28 | (2006.01) | |
| B32B 3/30 | (2006.01) | |
| B32B 7/14 | (2006.01) | |
| B32B 29/00 | (2006.01) | |
| D21H 27/00 | (2006.01) | |
| D21H 27/30 | (2006.01) | |
| D21H 27/32 | (2006.01) | |
| D21H 27/34 | (2006.01) | |

(52) U.S. Cl.
CPC .............. *B32B 3/28* (2013.01); *B32B 29/002* (2013.01); *D21H 27/002* (2013.01); *D21H 27/30* (2013.01); *D21H 27/32* (2013.01); *B32B 2250/26* (2013.01); *B32B 2307/726* (2013.01); *B32B 2555/00* (2013.01)

(58) Field of Classification Search
CPC ..... Y10T 428/24612; B32B 3/28; B32B 3/30; B32B 29/002; B32B 29/005; B32B 2250/26; B32B 7/14; D21H 27/002; D21H 27/30; D21H 27/32; D21H 27/34
See application file for complete search history.

(56) References Cited

U.S. PATENT DOCUMENTS

| | | | | |
|---|---|---|---|---|
| 3,953,638 | A | * | 4/1976 | Kemp ................... A47K 10/16 428/154 |
| 4,637,859 | A | | 1/1987 | Trokhan |
| 5,505,818 | A | | 4/1996 | Hermans et al. |
| 5,510,002 | A | | 4/1996 | Hermans et al. |

(Continued)

FOREIGN PATENT DOCUMENTS

| | | |
|---|---|---|
| EP | 0796727 A2 | 9/1997 |
| GB | 2380447 A | 4/2003 |

OTHER PUBLICATIONS

Written Opinion of the International Preliminary Examining Authority dated Oct. 23, 2018 in PCT/IB2017/056120.

(Continued)

*Primary Examiner* — Joanna Pleszczynska
(74) *Attorney, Agent, or Firm* — Laura L. Bozek (57) ABSTRACT

Products having improved ply bonding, moldability and drape and methods for making those products are described. The methods comprise producing a multi-ply adhesively bonded product comprising a pattern of uniformly spaced microembossed elements with a bond area of less than about 0.020 inches/sq. inch.

19 Claims, 6 Drawing Sheets

(56) References Cited

U.S. PATENT DOCUMENTS

| | | | |
|---|---|---|---|
| 5,672,248 | A | 9/1997 | Wendt et al. |
| 5,693,406 | A | 12/1997 | Wegele et al. |
| 5,972,813 | A | 10/1999 | Polat et al. |
| 6,017,417 | A | 1/2000 | Wendt et al. |
| 6,039,839 | A | 3/2000 | Trokhan et al. |
| 6,077,390 | A | 6/2000 | Salman et al. |
| 6,235,373 | B1 | 5/2001 | Graff |
| 6,277,226 | B1 | 8/2001 | Schulz |
| 6,464,831 | B1 | 10/2002 | Trokhan et al. |
| 6,585,855 | B2 | 7/2003 | Drew et al. |
| 6,610,173 | B1 | 8/2003 | Lindsay et al. |
| 6,896,767 | B2 | 5/2005 | Wilhelm |
| 6,942,755 | B2 | 9/2005 | Graff et al. |
| 7,871,692 | B2 | 1/2011 | Morin et al. |
| 8,475,908 | B2 | 7/2013 | Sauter et al. |
| 8,708,020 | B2 | 4/2014 | Schütz |
| 2003/0000664 | A1 | 1/2003 | Drew et al. |
| 2005/0103456 | A1 | 5/2005 | Hein et al. |
| 2005/0132904 | A1 | 6/2005 | Basler et al. |
| 2006/0278354 | A1 | 12/2006 | Russell et al. |
| 2007/0122595 | A1 | 5/2007 | Basler et al. |
| 2007/0264461 | A1 | 11/2007 | Gelli et al. |
| 2009/0117331 | A1 | 5/2009 | Fung et al. |
| 2011/0123773 | A1 | 5/2011 | Lofink et al. |
| 2011/0214580 | A1 | 9/2011 | Sauter et al. |
| 2012/0156447 | A1 | 6/2012 | Hein et al. |
| 2012/0244320 | A1 | 9/2012 | Sauter et al. |
| 2013/0220151 | A1 | 8/2013 | Sauter et al. |
| 2013/0323453 | A1 | 12/2013 | Hirasawa et al. |
| 2013/0344294 | A1 | 12/2013 | Eilert et al. |
| 2014/0117135 | A1 | 5/2014 | Graff et al. |
| 2014/0251530 | A1 | 9/2014 | Giurlani et al. |
| 2015/0330030 | A1 | 11/2015 | Dwiggins et al. |
| 2016/0090698 | A1 | 3/2016 | Fan et al. |

OTHER PUBLICATIONS

International Search Report and Written Opinion of the International Searching Authority dated Jan. 22, 2018 in PCT/IB2017/056120.

International Preliminary Report on Patentability (Chapter II of the Patent Cooperation Treaty) dated Jan. 14, 2019 in PCT/IB2017/056120.

* cited by examiner

LAMINATED MULTI-PLY TISSUE PRODUCTS WITH IMPROVED SOFTNESS AND PLY BONDING

CROSS-REFERENCE TO RELATED APPLICATION

This application is based on Provisional Patent Application No. 62/408,380 filed Oct. 14, 2016, which is hereby incorporated by reference in its entirety.

The present disclosure relates to laminated tissue products and methods of making the same. More particularly, the present disclosure relates to a structured tissue product having improved ply-bonding without significant increases in product stiffness. Still more particularly, the present disclosure relates to a structured tissue product with a microemboss pattern that provides improved adhesive distribution, resulting in a product with improved ply-bonding while still possessing one or more of improved softness, moldability, drape and GM stretch, and in one embodiment, while maintaining the visual appearance of a pattern imparted in the papermaking process.

The consumer's daily life is filled with a variety of modern products that are produced solely for the comfort and convenience of the consumer. Absorbent paper products are ubiquitous in modern society. U.S. consumers purchase $10s of billions of dollars worth of absorbent tissue products each year. Absorbent products take a variety of typical forms, for example, paper towel, toilet tissue, napkins, wipers and the like. Absorbent products are generally produced as one or more tissue sheets that may, in appropriate products, be bonded to one another to improve the absorbency of the finished product.

Consumer acceptance of absorbent paper products, such as tissue paper products and the like, is heavily influenced by the perceived softness of the tissue product. Indeed, the consumer's perception of the desirability of one tissue product over another is often based in significant respects on the perceived relative softness of the tissue product; the tissue product that is perceived to be softest is typically perceived to be more acceptable.

Thus, tissue paper used in the production of commercial absorbent products should ideally possess a relatively high degree of perceived puffiness and softness. Product attributes are imparted to an absorbent product both during the production of the tissue sheet and during the converting operations that are used to produce the final product. Emboss definition and bulk of the tissue paper are commonly found to affect the perceived softness of the absorbent product. However, not all operations required to produce an absorbent product improve the product attributes. Some of the operations that can negatively impact softness include, by way of example, calendaring, printing, lotion coating and glue lamination.

The typical tissue embossing process involves the compression and stretching of the flat tissue base sheet between a relatively soft rubber roll and a hard roll which bears a pattern of emboss elements. This method of embossing improves the aesthetics of the tissue and the structure of the tissue roll. Adhesive is generally applied to the tips of the embossments and the plies are bonded in a tip to tip arrangement. However, due to the typical distance between the emboss elements, there remains a significant chance of ply slippage. Further, tip to tip ply bonding tends to interfere with the aesthetics of patterns that were imparted to the tissue sheet during production.

Glue lamination is known to increase the sheet stiffness and reduce the perceived softness of the sheet so greatly, that many alternative ply-bonding methods have been developed. In the area of adhesive bonding, in addition to tip to tip bonds, spray patterns of adhesive have become state of the art. Mechanical methods include knurling, edge embossing, and perforation embossing have been used, but have drawbacks associated with the aesthetics of the products. Other non-adhesive methods have been attempted, for example, ultrasonic bonding. However, glue lamination remains one of the most effective means for reducing ply separation during use.

Multi-layer products on the market that use embossing elements of significant diameter or size require significant amounts of adhesive in order to achieve an appropriate ply bond. In a glue bond application, the amount of adhesive correlates to a reduction in softness and increase in rigidity or stiffness. Thus, there remains a need to improve tissue ply bonding without experiencing a concomitant loss in softness or visual appearance.

The present disclosure provides for a multi-ply, glue laminated tissue product having improved bond strength without sacrificing product softness or affecting visual appearance. According to one embodiment, the method of the present disclosure distributes the glue bonds across the tissue sheet making it possible to achieve good ply bonding without the expected increases in stiffness or the aesthetic pattern disruption associated with prior art products.

SUMMARY OF THE DISCLOSURE

The present disclosure relates to a multi-ply glue laminated tissue product with a micro emboss pattern as described in the instant disclosure. The distribution of glue across the tissue surface(s) allows the base sheets to be strongly bonded without compromising one or more of softness, drape and moldability. The distribution of the glue via the microembossments results in a tissue product with more homogeneous glue application across the product, thereby achieving the desired ply bonding while minimizing the impact of any one area of glue application. The product, once bonded, retains softness and drape, but also prevents ply separation during use. Further, due to the size of the elements, the glue lamination resides in the background of any pattern that exists in the base sheet.

In one embodiment, the present disclosure relates to a structured multi-ply tissue product comprising, a first tissue ply comprising a pattern of microembossments having less than about 125 embossments per square inch comprising a base and a tip; a second tissue ply; an adhesive applied to the tips of the microembossments and configured to achieve a bond area of less than about 0.020 inches/sq. inch; and wherein at least one of the two plies has a pattern that was imparted in the tissue during the paper making process.

According to another embodiment, the disclosure relates to a multi-ply tissue product comprising, a first tissue ply comprising a pattern of microembossments, the microembossments comprising a base and a tip; a second tissue ply; an adhesive applied to the tips of the microembossments; and wherein the product has a ply bond strength of at least about 1000 inches/square inch of bond area.

According to yet another embodiment, the disclosure relates to a method of minimizing ply separation in a multi-ply product comprising, embossing a first tissue ply with a microemboss pattern having less than 125 microemboss elements per square inch; applying glue to the tops of the microemboss elements; bonding the first tissue ply to a second tissue ply to achieve a bond area of less than 0.020 inches per square/inch.

A multi-ply tissue product comprising, a first tissue ply comprising a pattern of microembossments having less than about 16 embossments per square inch comprising a base and a tip; a second tissue ply; and an adhesive applied to the tips of the microembossments and configured to achieve a bond area of less than about 0.0015 inches/sq. inch.

According to yet another embodiment, the disclosure relates to a method of embossing and laminating a multi-ply product comprising, embossing a signature pattern in at least one of a first ply or a second ply of a multi-ply product; separately embossing the first tissue ply with a microemboss pattern having less than 125 microemboss elements per square inch; applying glue to the tops of the microemboss elements; bonding the first tissue ply to the second tissue ply to achieve a bond area of less than 0.020 inches per square/inch.

Additional advantages of the described methods and products will be set forth in part in the description which follows, and in part will be obvious from the description, or may be learned by practice of the disclosure. The advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed. The accompanying drawings, which are incorporated in and constitute a part of this specification, illustrate several embodiments and together with the description, serve to explain the principles of the disclosure.

DESCRIPTION

Reference will now be made in detail to certain exemplary embodiments, examples of which are illustrated in the accompanying drawings. Wherever possible, the same reference numbers will be used throughout the drawings to refer to the same or like items.

The present disclosure relates to a glue laminated structured tissue product. The methods as described can be used to produce multi-ply products including toilet tissue, paper towels, napkins, facial tissue, wipers, and other consumer tissue products desiring an aesthetic look and improved durability. The embossing method as disclosed can be applied to any non-woven product, natural or synthetic, where overall softness is maintained, and greater bond strength is desired.

Tissue products have historically been and continue to be made using conventional wet pressing. However, the industry has been moving away from conventional wet pressing to more modern methods of making premium grades tissues. Through-air-drying has been around for a while and most of the newer mills are moving to some variation of this method. Through-air-drying produces a premium sheet having bulk, softness and absorbency.

In conventional wet pressing, the nascent web is transferred to a papermaking felt and is dewatered by passing it between the felt and a press roll under pressure. The web is then pressed by a suction press roll against the surface of a rotating Yankee dryer cylinder that is heated to cause the paper to substantially dry on the cylinder surface. The moisture within the web as it is laid on the Yankee surface causes the web to transfer to the surface. Liquid adhesive may be applied to the surface of the dryer, as necessary, to provide substantial adherence of the web to the surface. The web is then removed from the Yankee surface with a creping blade. The creped web is then passed between calendar rollers and rolled up to be used as a base sheet in the downstream production of a tissue product. This method of making tissue sheets is commonly referred to as "wet-pressed" because of the compactive method used to dewater the wet web.

As used in the present disclosure "wet press," "wet-pressed," "wet-pressing, " "conventional wet press," "CWP" and other variations on those phrases refer to processes by which a base sheet can be produced. These processes all share the characteristic that the sheet is dewatered under pressure. While one conventional wet pressing operation is described above, the system is only exemplary and variations on the described system will be readily apparent to the skilled artisan.

As an alternative to conventional wet press technology, through-air-drying ("TAD") methods have been developed in which the nascent web is partially dewatered using vacuum suction. Thereafter, the partially dewatered web is dried without compression by passing hot air through the web while it is supported by a through-drying fabric. However, as compared to conventional wet pressing, through-air-drying is expensive in terms of capital and energy costs. Because of the consumer perceived softness of these products, and their greater ability to absorb liquid than webs formed in conventional wet press processes, the products formed by the through-air-drying process enjoy an advantage in consumer acceptance.

Because it does not suffer from compaction losses, through-air-dried tissue base sheets currently exhibits the highest caliper, i.e., bulk, of any base sheet for use in premium absorbent products. Because of the high energy demands of TAD, other structured tissue technologies have been developed. These technologies all use special fabrics or belts to impart a structure to the sheet but use significantly lower nip loads for dewatering than conventional wet pressing. Systems for producing structured tissue include, for example, advanced tissue molding system "ATMOS" used by Voith, or energy efficient technologically advanced drying "eTAD", used by Georgia Pacific. These processes, like TAD, have a higher energy consumption than conventional wet pressing.

In connection with the production of structured sheets, fabric molding has also been employed as a means to provide texture and bulk. In this respect, there is seen in U.S.

Pat. No. 6,610,173 to Lindsay et al. a method for imprinting a paper web during a wet pressing event which results in asymmetrical protrusions corresponding to the deflection conduits of a deflection member. The '173 patent reports that a differential velocity transfer during a pressing event serves to improve the molding and imprinting of a web with a deflection member. The tissue webs produced are reported as having particular sets of physical and geometrical properties, such as a pattern densified network and a repeating pattern of protrusions having asymmetrical structures. With respect to wet-molding of a web using textured fabrics, see, also, the following U.S. Pat. Nos. 6,017,417 and 5,672,248 both to Wendt et al.; U.S. Pat Nos. 5,505,818 and 5,510,002 to Hermans et al. and U.S. Pat No. 4,637,859 to Trokhan. With respect to the use of fabrics used to impart texture to a mostly dry sheet, see U.S. Pat. No. 6,585,855 to Drew et al., as well as United States Publication No. U.S. 2003/0000664 A1.

As used herein "structured tissues" or "structured webs" refer to tissue made by TAD or other structured tissue technologies. These processes all share the characteristic that the sheet is dewatered under limited or no compaction. While one through-air-drying operation is described above, the system is only exemplary and variations on the described system will be readily apparent to the skilled artisan.

As used herein "web," "sheet," "tissue," "nascent web," "tissue product," "base sheet" or "tissue sheet," can be used interchangeably to refer to the fibrous web during various stages of its development. Nascent web, for example, refers to the embryonic web that is deposited on the forming wire. Once the web achieves about 30% solids content, it is referred to as a tissue, or a sheet or a web. Post production, the single-ply of tissue is called a base sheet. The base sheet may be combined with other base sheets to form a tissue product or a multi-ply product.

The base sheet for use in the products of the present disclosure may be made from any art recognized fibers. Papermaking fibers used to form the absorbent products of the present disclosure include cellulosic fibers, commonly referred to as wood fibers. Specifically, the base sheet of the disclosure can be produced from hardwood (angiosperms or deciduous trees) or softwood (gymnosperms or coniferous trees) fibers, and any combination thereof. Hardwood fibers include, but are not limited to maple, birch, aspen and eucalyptus. Hardwood fibers generally have a fiber length of about 2.0 mm or less. Softwood fiber includes spruce and pine and exhibit an average fiber length of about 2.5 mm. Cellulosic fibers from diverse material origins may also be used to form the web of the present disclosure. The web of the present disclosure may also include recycle or secondary fiber. The products of the present disclosure can also include synthetic fibers as desired for the end product.

Papermaking fibers can be liberated from their source material by any one of the number of chemical pulping processes familiar to one experienced in the art including sulfate, sulfite, polysulfite, soda pulping, etc. The pulp can be bleached as desired by chemical means including the use of chlorine, chlorine dioxide, oxygen, etc. Alternatively, the papermaking fibers can be liberated from source material by any one of a number of mechanical/chemical pulping processes familiar to anyone experienced in the art including mechanical pulping, thermomechanical pulping, and chemithermomechanical pulping. These mechanical pulps can be bleached, if one wishes, by a number of familiar bleaching schemes including alkaline peroxide and ozone bleaching.

The fiber is fed into a headbox where it will be admixed with water and chemical additives, as appropriate, before being deposited on the forming wire. The chemical additives for use in the formation of the base sheets can be any known combination of papermaking chemicals. Such chemistry is readily understood by the skilled artisan and its selection will depend upon the type of end product that one is making. Papermaking chemical include, for example, strength agents, softeners and debonders, creping modifiers, sizing agents, optical brightening agents, retention agents, and the like. The method used in the instant disclosure to increase sheet bulk should not generally be affected by the chemistry of the base sheet.

A first nascent web is formed from the pulp. The web can be formed using any of the standard process known to the skilled artisan, e.g., crescent former, suction breast roll, twin-wire former, etc. According to one embodiment, the web has a basis weight, under TAPPI LAB CONDITIONS of at least about 9 lbs/3000 sq. ft. ream, for example, at least about 10 lbs/3000 sq. ft. ream, for example, at least about 11-14 lbs/3000 sq. ft. ream. TAPPI LAB-CONDITIONS refers to TAPPI T-402 test methods specifying time, temperature and humidity conditions for a sequence of conditioning steps.

The web is transferred from the forming wire to a fabric for non-compactive, e.g., vacuum suction, or limited compactive dewatering. Thereafter, the partially dewatered web is dried without compression by passing hot air through the web while it is supported by a the fabric.

The web is then calendered and rolled to await converting. Converting refers to the process that changes or converts base sheets into final products. Typical converting in the area of tissue and towel includes embossing, perforating, and plying.

While exemplary formation of the base sheet is detailed above, products using any base sheet can benefit from being embossed with a pattern of numerous micro-sized emboss elements, along with the added feature of applying adhesive to the tips of these elements associated with the disclosed invention. The base sheet for use in the present disclosure can be produced by CWP, TAD or other structured tissue formation methods and can include base sheets that are creped or uncreped, homogeneous or stratified, wet-laid or air-laid and may contain up to 100% non-cellulose fibers.

According to one embodiment, the products of the present invention may have a signature pattern imparted to them from the fabric upon which they are formed. During the production of structured base sheets, the fibers are drawn into the pattern of the fabric or belt. According to one embodiment, a signature pattern is created in a belt and that pattern is then transferred from the belt to the tissue web during drying.

As used herein signature pattern refers to an embossing pattern that is created by or belongs to the manufacturer of the tissue product. Embossing patterns are generally made up of elements that form a design. The individual bosses can either be elongate or have an aspect ratio closer to 1. The bosses are arranged to create a design that forms the signature pattern. The signature pattern may or may not, itself, be an indication of source of the goods, but it often contains one or more design elements that are trademarks or other source identifiers. The signature pattern may contain a series of homogeneous and/or repetitive bosses or it may be more decorative and include elements that are artistic, e.g., flowers, butterflies, clouds, etc.

The microemboss pattern provides a bonding surface that does not interfere with the aesthetics of the signature pattern. At the same time, the microemboss pattern creates a substantially homogeneous glue pattern that improves the ply bond strength between the tissue plies. According to one embodiment, by reducing the size of the emboss elements and/or spacing between at least about 60%, for example, at least about 70%, for example at least about 85%, for example, at least about 90% of the elements, when the glue adhesive is applied to the element tops, a more even and stronger bond strength is achieved.

The multi-ply tissue product of the present disclosure will be described with reference to the various plies. As used in the present disclosure "topmost," "top ply," "front, "frontmost," are interchangeable and refer to the exposed ply of a tissue ribbon that will form the top of the final tissue product. The phrases "backmost," "back," "bottom ply," "bottommost" are interchangeable and refer to the exposed ply on the reverse of the final tissue product.

The multi-ply products of the present disclosure have a topmost and backmost sheet with a pattern of microemboss elements that are spaced from about 0.4 inches down to about 0.01 inches apart, and, wherein the elements have a diameter of about 0.014 to 0.021 inches, and wherein, the topmost and backmost plies are bonded, which improves the plybond strength while maintaining softness of the product. According to one embodiment, the microemboss pattern on the topmost and/or bottommost ply is continuous across about 75% to about 95% of the tissue. According to one embodiment, the microemboss pattern is continuous across at least 50% of the tissue, for example, at least 60%, for example, at least 70%. While the structure of the embossments is one aspect of the present disclosure, the embossments can take a variety of shapes or forms.

According to one embodiment, the topmost and/or backmost microemboss pattern can be used to hold adhesive that will be used to bond the plies. In this embodiment, each or substantially all of the tips of the individual emboss elements may carry adhesive. According to one embodiment, a preferred spacing, sizing and number of the elements is disclosed to achieve excellent ply bonding without a significant increase in stiffness. Other embodiments are contemplated that adjust any or all of spacing, sizing and number of emboss elements to result in better ply bonding and good softness, the invention only being limited by the scope of the appended claims.

By embossing the base sheet with elements in a pattern with a uniformity ratio of about 1 and, wherein, at least 50%, for example at least about 60%, for example at least about 70%, for example at least about 80%, for example at least about 85%, of the elements have a size from about 0.014 to 0.021 inches, the amount of glue required to achieve a strong ply bond can actually increase over current state of the art amounts, and the product has the advantage of having a stronger and more even glue bond application per sq/in. In spite of this increase in overall adhesive, the tissue maintains softness, drape and moldability.

Another feature of embodiments of the present disclosure is that the appearance of the base sheet remains intact. Due to the sizing of the embossments, when the base sheets are embossed, the bosses do not deform the web. The result is a product that does not have a different optical appearance on either the topmost or bottommost ply. The lack of demarcation of the web is such that it does not change the light reflection of the sheet.

As defined herein, the bond area is calculated by measuring the bond area of the emboss pattern across the entire CD or MD of the repeat unit. The bond area is measured on a linear basis across the repeat unit. The bond area as defined herein is calculated based upon either the embossing roll used to produce the embossed sheet or the engineering drawings used to produce the emboss roll. The bond area of the emboss patterns for use in the present disclosure range between about 0.07% and about 2% of the total area of the tissue.

Alternatively, the bond area may be expressed as the bond area in inches per square inch. According to one embodiment, the bond area is less than about 0.017 in/square inch, for example, less than about 0.015 inches/square inch, for example less than about 0.013 inches/square inch, for example less than about 0.012 inches/square inch, for example less than about 0.010 inches/square inch, for example, less than 0.005 inches per square inch, for example less than about 0.003 inches/square inch, for example, less than about 0.0015 inches/square inch.

Figure 1:
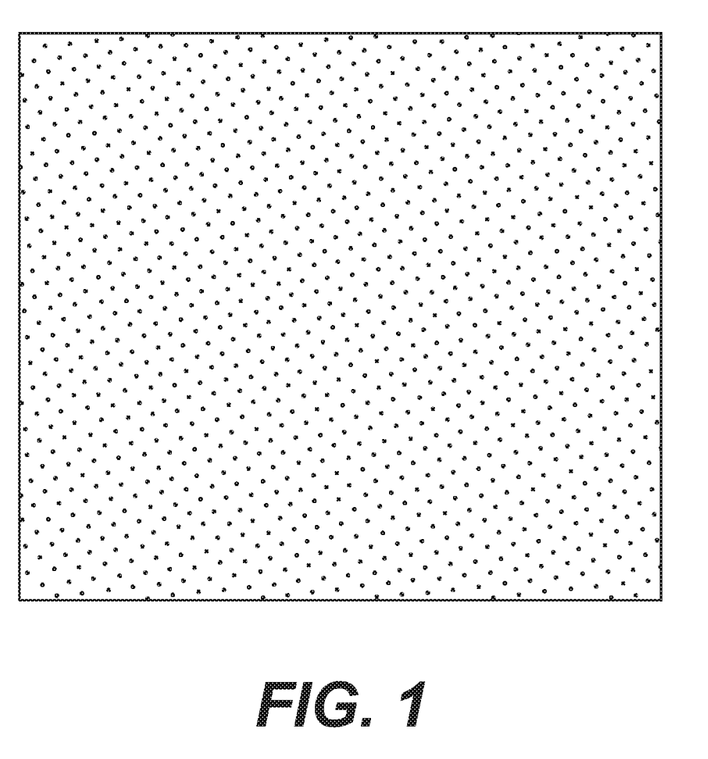
FIG. 1 illustrates an emboss pattern for use on the topmost or backmost ply of a multi-ply product containing about 26 elements per sq./in. according to the disclosure.

FIG. 1 depicts one repeating pattern for use in the products of the present disclosure. For rolled products, the pattern would generally traverse the entire width and length of the base sheet. The pattern contains a continuous and regular pattern of microembossments containing about 26 elements per sq/in. As used herein, these embossing elements can be on the topmost or bottommost ply of the product. The pattern as shown in FIG. 1, contains elements of a single size.

Figure 2:
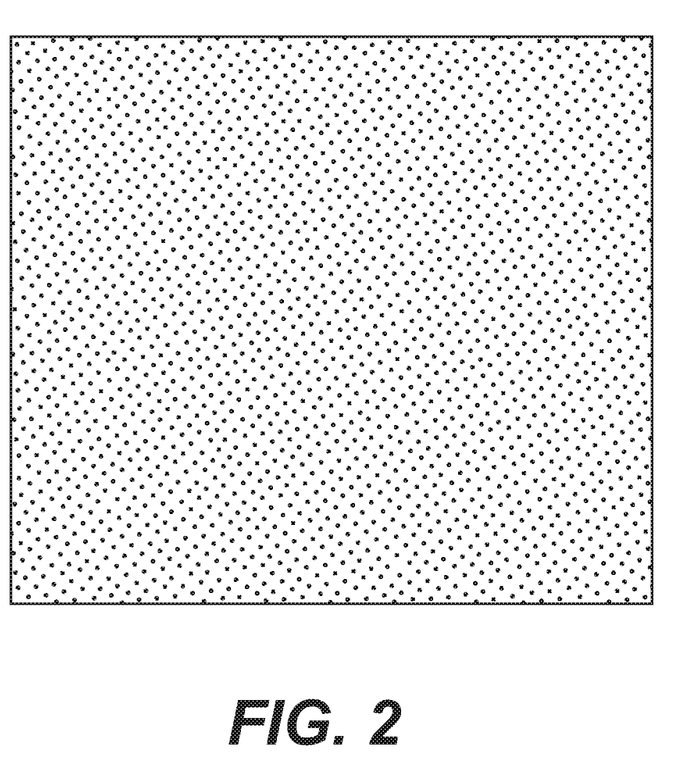
FIG. 2 illustrates an emboss pattern for use on the topmost or bottommost ply of a multi-ply product containing about 52 elements per sq./in. according to the disclosure.

FIG. 2 depicts one repeating pattern for use in the products of the present disclosure. For rolled products, the pattern would generally traverse the entire width and length of the base sheet. The pattern contains a continuous and regular pattern of embossments containing about 52 elements per sq/in. As used herein, these embossing elements can be on the topmost or bottommost ply of the product. The pattern as shown in FIG. 2, contains elements of a single size.

Figure 3:
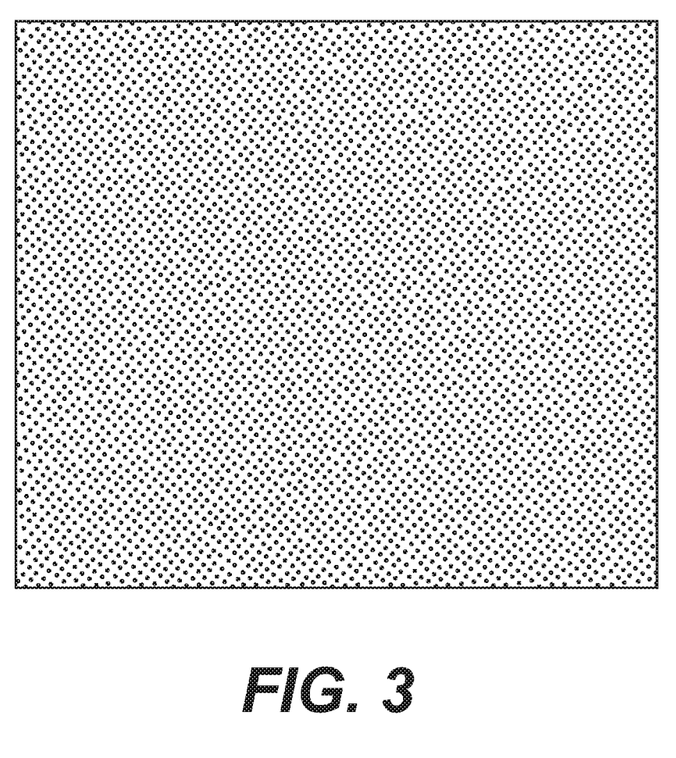
FIG. 3 illustrates an emboss pattern the topmost or backmost ply containing about 107 elements per sq./in. according to the disclosure.

FIG. 3 depicts one repeating pattern for use in the products of the present disclosure. For rolled products, the pattern would generally traverse the entire width and length of the base sheet. The pattern contains a continuous and regular pattern of embossments containing about 107 elements per sq/in. As used herein, these embossing elements can be on the topmost or bottommost ply of the product. The pattern as shown in FIG. 3, contains elements of a single size.

Figure 4:
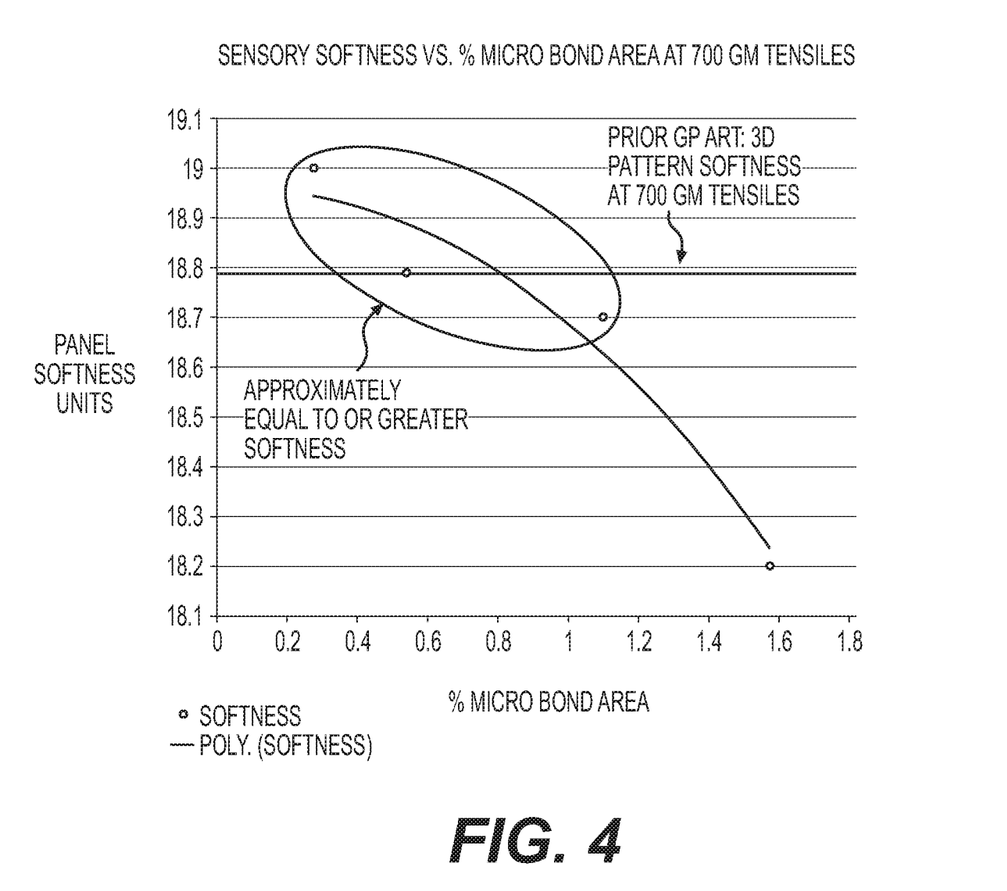
FIG. 4 illustrates a line graph of improved sensory softness vs. percentage of the micro bond area.

FIG. 4 is a chart of the present disclosure based on the discovery that unexpectedly advantageous results were achieved by combining a very uniform lamination with a pattern of uniformly spaced emboss elements per square inch, this provided particularly advantageous results at approximately equal to or greater softness.

Figure 5A:
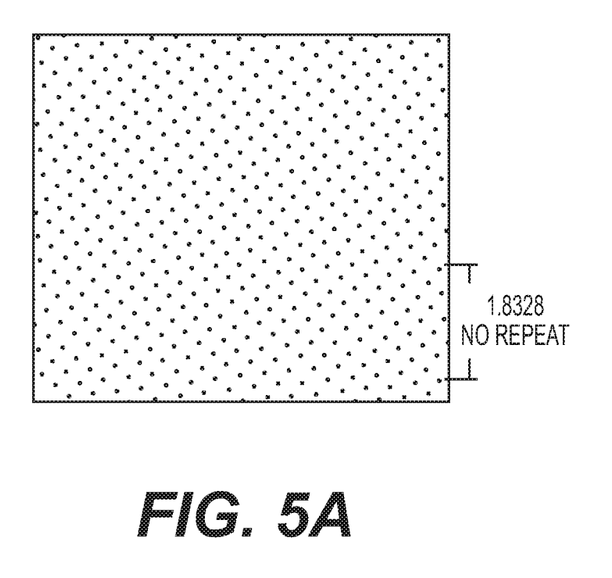
FIGS. 5A-5B illustrate an emboss pattern for use on the topmost or backmost ply containing 12 elements per sq./in. according to the disclosure.
Figure 5B:
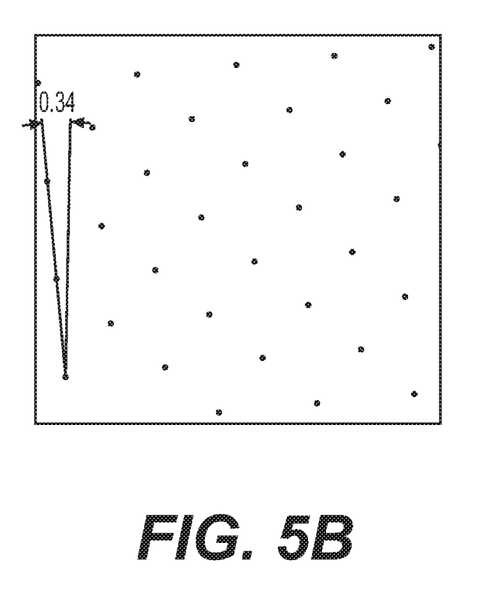

FIG. 5A depicts one repeating pattern for use in the products of the present disclosure. For rolled products, the pattern would generally traverse the entire width and length of the base sheet. The pattern contains a continuous and regular pattern of embossments containing about 12 elements per sq/in. As used herein, these embossing elements can be on the topmost or bottommost ply of the product. The pattern as shown in FIG. 5A, contains elements of a single size. FIG. 5B is an enlarged view of the pattern of FIG. 5A, making it easier to observe the pattern offset from the machine direction.

According to one embodiment, the embossing elements have a uniformity ratio of about 1 and less than about 2.0. Examples of elements having this ratio include, for example, but are not limited to, circles, ovals, squares and the like.

According to one embodiment, the embossing elements have a size of from between about 0.014 inches and about 0.021 inches. As used herein, "size" refers to the measurement of the shortest dimension of the emboss element.

According to one embodiment, the average density of the embossing elements is less than about 125 emboss elements/sq. in, for example, less than about 110 emboss elements/sq. in, for example, less than about 70 emboss elements/ sq. in, for example, less than about 55 emboss elements/sq. in, for example, less than about 35 emboss elements/sq. in, for example, less than about 25 emboss elements/sq. in, for example less than 15 emboss elements/sq. in, or for example, from about 10 to about 70 emboss elements/sq. in, for example, from about 10 to about 50 emboss elements/sq. in.

According to one embodiment, as shown in FIGS. 1-3 and 5, the pattern contains embossing elements having a size of about 0.014 inches, and an average density of less than about 110 embossing elements/sq. in.

Unless otherwise specified, "basis weight", "BWT", "BW", and so forth, refers to the weight of a 3000 square-foot ream of product (basis weight is also expressed in $g/m^2$ or gsm). Likewise, "ream" means a 3000 square-foot ream, unless otherwise specified. The multi-ply product of the present disclosure has a single base sheet basis weight of from about 9 to about 15 lbs/ream, for example, from about 10 to about 13 lbs/ream, for example, from about 11 to about 12 lbs/ream.

Calipers reported herein are 8-sheet calipers unless otherwise indicated. The sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with 2-in (50.8-mm) diameter anvils, 539±10 grams dead weight load, and 0.231 in./sec descent rate. For finished product testing, each sheet of product to be tested must have the same number of plies as the product is sold. For base sheet testing off of the paper machine reel, single plies are used with eight sheets being selected and stacked together. Specific volume is determined from basis weight and caliper.

The multi-ply product of the present disclosure has a caliper of from at least about 15.0 to about 25.0 mils/8 sheets/lb/R, for example, from about 17 to about 20 mils/8 sheets/lb/R.

Dry tensile strengths (MD and CD), stretch, ratios thereof, break modulus, stress and strain are measured with a standard Instron test device or other suitable elongation tensile tester which may be configured in various ways, typically using 3 or 1 inch wide strips of tissue or towel, conditioned at 50% relative humidity and 23° C. (73.4° F.), with the tensile test run at a crosshead speed of 2 in/min for modulus, 10 in/min for tensile. For purposes of calculating modulus values, inch wide specimens were pulled at 0.5 inches per minute so that a larger number of data points were available. Unless otherwise clear from the context, stretch refers to stretch (elongation) at break. Break modulus is the ratio of peak load to stretch at peak load. Tensile modulus, reported in grams per inch per percent strain, is determined by the same procedure used for tensile strength except that the modulus recorded is the geometric mean of the chord slopes of the cross direction and machine direction load-strain curves from a value of 0 to 100 grams, and a sample width of only one inch is used.

GMT refers to the geometric mean tensile strength of the CD and MD tensile. Tensile energy absorption (TEA) is measured in accordance with TAPPI test method T494 om-01.

The multi-ply product of the present disclosure has a Geometric Mean Tensile Strength of from about 695 to about 750, for example, from about 700 to about 745, for example, from about 710 to about 740, for example, from about 710 to about 730.

The multi-ply product of the present disclosure has a roll compression of from about 14% to about 20%, for example, from about 14% to about 19%, for example, from about 15% to about 19%.

The multi-ply product of the present disclosure has a TMI ply bond of at least about 1.5 g, for example from about 1.5 grams to about 22 g, for example at least about 3 g, for example, from about 3 g to about 22 g, for example, from about 8 g to about 22 g. TMI ply bond is measured according to the following procedure.

Ply bond strengths reported herein are determined from the average load required to separate the plies of two-ply tissue, towel, napkin, and facial finished products using TMI Ply Bond Lab Master Slip & Friction tester Model 32-90, with high-sensitivity load measuring option and custom planar top without elevator available from: Testing Machines Inc. 2910 Expressway Drive South Islandia, N.Y. 11722; (800)-678-3221; www.testingmachines.com. Ply Bond clamps are available from: Research Dimensions, 1720 Oakridge Road, Neenah, Wis. 54956, Contact: Glen Winkler, Phone: 920-722-2289 and Fax: 920-725-6874.

Samples are preconditioned according to TAPPI standards and handled only by the edges and corners care being exercised to minimize touching the area of the sample to be tested.

At least ten sheets following the tail seal are discarded. Four samples are cut from the roll thereafter, each having a length equivalent to 2 sheets but the cuts are made ¼" away from the perforation lines by making a first CD cut ¼" before a first perforation and a second CD cut ¼" before the third perforation so that the second perforation remains roughly centered in the sheet. The plies of the each specimen are initially separated in the leading edge area before the first perforation continuing to approximately ¼" past this perforation.

The sample is positioned so that the interior ply faces upwardly, the separated portion of the ply is folded back to a location ½" from the initial cut and ¼" from the first perforation, and creased there. The folded back portion of the top ply is secured in one clamp so that the line contact of the top grip is on the perforation; and the clamp is placed back onto the load cell. The exterior ply of the samples is secured to the platform, aligning the perforation with the line contact of the grip and centering it with the clamp edges.

After ensuring that the sample is aligned with the clamps and perforations, the load-measuring arm is slowly moved to the left at a speed of 25.4 cm/min, for a test length of 16.5 cm and the average load between 5-14 cm on the arm (in g.) is measured and recorded. The average of 3 samples is recorded with the fourth sample being reserved for use in case of damage to one of the first three.

For products having more than two plies follow the same preparation procedure and obtain two samples. Take one sample and test each of the plies starting with the outside ply and removing one sheet at a time until all plies are tested. Each of the individual ply bonds are averaged to obtain the ply bond value in grams. Test the other sample the same way and the average of the two in grams is reported.

According to one embodiment, the multi-ply product of the present disclosure has a saturation capacity of from about 1600 to about 1850 $g/m^2$, for example, from about 1700 to about 1850 g/m², for example from about 1800 to about 1850 g/m², for example, from about 1810 to about 1840 g/m².

According to one embodiment, the base sheets of the present disclosure can be embossed and laminated in a traditional rigid-resilient fashion. Either or both the signature pattern and the microemboss pattern can be applied to the tissue base sheets using this rigid-resilient configuration.

According to another embodiment, the base sheets can also be embossed between two hard rolls each of which contain both male and female elements. The elements of one emboss roll are engaged or mated with the female elements of another mirror image emboss roll. These emboss rolls can be made of materials such as steel or hard rubber. In this process, the base sheet is only compressed between the sidewalls of the male and female elements. Therefore, base sheet thickness is better preserved and bulk perception of a product is much improved. This mated process and pattern also creates a softer tissue because the top of the tissue protrusions remain soft and uncompressed. According to one embodiment, the base sheets of the present disclosure can be embossed in a rigid-rigid fashion, for either or both the signature pattern and the microemboss pattern.

According to one embodiment, the basesheets are dried and rolled and subsequently embossed to provide a microemboss pattern in accordance with the present disclosure. According to this embodiment, the adhesive may be applied to the tips of the microemboss elements either on one or both plies of tissue. The plies are then married to form the multi-ply product.

According to another embodiment, the basesheets are dried and rolled and subsequently embossed to provide a combined signature and microemboss pattern in accordance with the present disclosure. According to this embodiment, the adhesive may be applied to the tips of the microemboss elements either on one or both plies of tissue. The plies are then married to form the multi-ply product.

Figure 6:
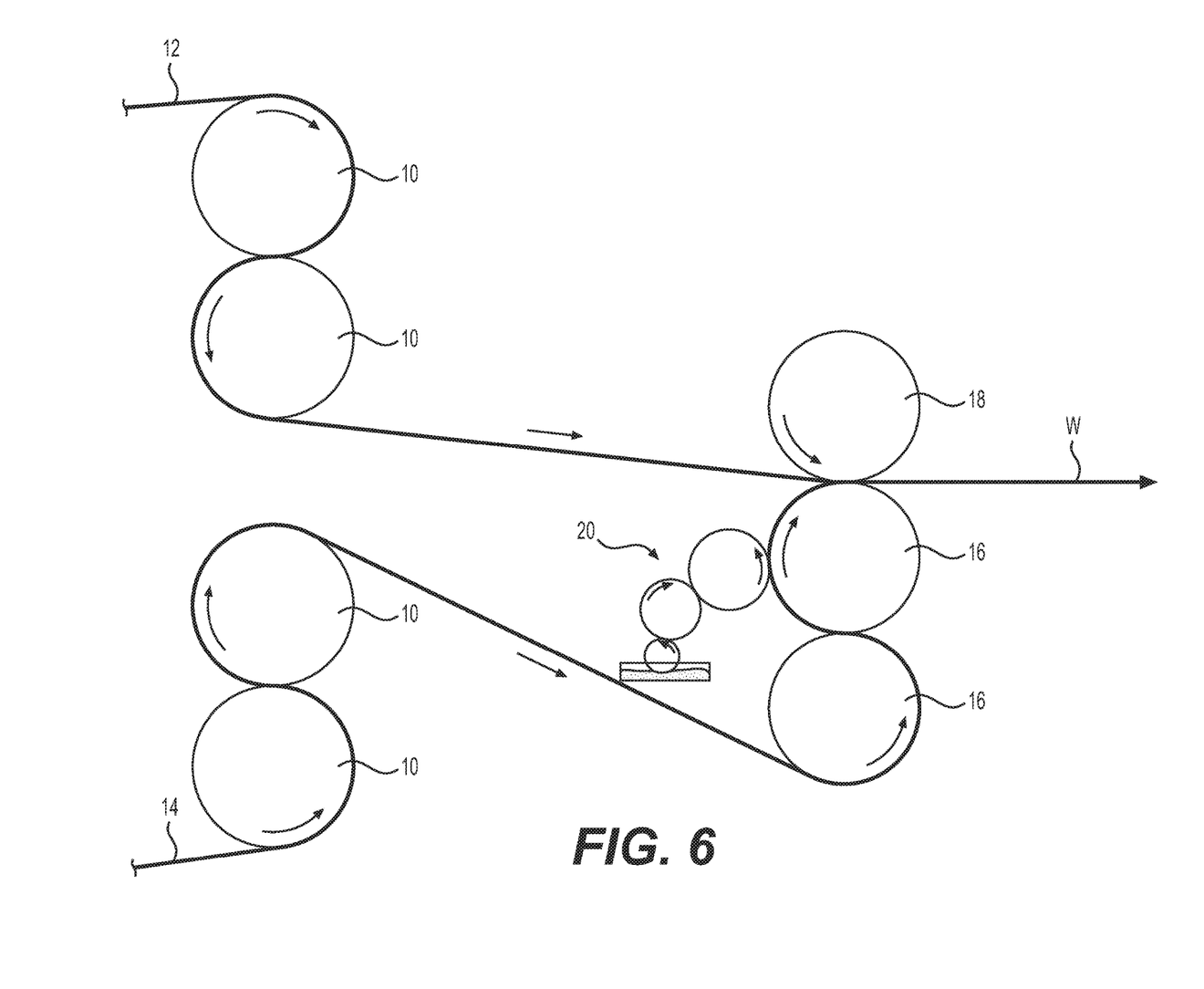
FIG. 6 illustrates a process for producing an absorbent product using separate emboss and emboss and lamination steps.

According to yet another embodiment, the products of the present disclosure are dried and rolled and subsequently embossed to provide a signature pattern. According to this embodiment, one or more plies of tissue are passed through an emboss nip and embossed to form a signature pattern. After the signature pattern is formed, the ply(s) are then passed through a subsequent embossing nip to impart the microemboss pattern, apply glue to the tips of the microembossment and ply the tissue sheets. As can be seen in FIG. 6, individual plies, 12 and 14 are passed between embossing rolls 10, where a pattern is imparted to the plies. According to this embodiment, the ply 14 is passed between embossing rolls 16 to impart a micropattern as described herein and as embodied, for example, in FIGS. 1-5. According to the embodiment shown, the micoremboss pattern is applied only to ply 14 via embossing rolls 16. After the microemboss pattern is formed on the web, adhesive is applied to the web via adhesive well and rolls 20. The plies 12 and 14 are bound via marrying roll 18 into final multi-ply product W. While this embodiment only shows the microembossing of ply 14, it is fully contemplated that the microemboss pattern can be applied to either ply 14 or ply 12, or both.

According to one embodiment, even with the addition of more emboss elements and a therefore a larger glue bond area, the multi-ply product of the present disclosure has maintained its drape and moldability due to the proportionate sizing and spacing of the emboss elements along the base sheet.

According to one embodiment, the embossing and lamination as described may be applied to a three-ply product. According to one embodiment, the embossing elements are embossed into the bottommost ply and the bottommost ply is adhered to the top two plies. According to another embodiment, the embossing elements may be embossed into at least two of the three plies.

Sensory Softness

Sensory softness of the samples was determined by using a panel of trained human subjects in a test area conditioned to TAPPI standards (temperature of 71.2° F. to 74.8° F., relative humidity of 48% to 52%). The softness evaluation relied on a series of physical references with predetermined softness values that were always available to each trained subject as they conducted the testing. The trained subjects directly compared test samples to the physical references to determine the softness level of the test samples. The trained subjects assigned a number to a particular paper product, with a higher sensory softness number indicating a higher perceived softness.

Subjective product attributes, such as sensory softness, are often best evaluated using test protocols in which a consumer uses and evaluates a product. In a "monadic" test, a consumer will use a single product and evaluate its characteristics using a standard scale. In paired comparison tests, the consumers are given samples of two different products and asked to rate each vis-à-vis the other for either specific attributes or overall preference. Sensory softness is a subjectively measured tactile property that approximates consumer perception of sheet softness in normal use. Softness is usually measured by 20 trained panelists and includes internal comparison among product samples. The results obtained are statistically converted to a useful comparative scale.

The multi-ply structured tissue product of the present disclosure has an improved sensory softness of from about 18 to about 19.3, for example, from about 18.2 to about 19.2, for example, from about 18.7 to about 19.2.

The following examples provide representative embodiments. The methods and products described herein should not be limited to the examples provided. Rather, the examples are only representative in nature.

EXAMPLE 1

Two ply paper products were produced using structured base sheets. The product of the invention was embossed with the patterns as shown in FIGS. 1-3.

As can be seen from Table 1, below, two-ply products according to the present invention exhibited significant improvements in bond strength/bond area and drape (lower GM modulus) while maintaining the appearance of the base web and equal or better softness.

When comparing the inventive product against the conventionally embossed product on the base sheets, the GM Stretch of the inventive product exhibited an improvement from about 2% to about 5%.

TABLE 1

| Product IDs and converting process | Quilted Northern Commercial pattern | Core Patterns for Invention | | |
|---|---|---|---|---|
| | | FIG. 1 | FIG. 2 | FIG. 3 |
| Sheet Count | 173 | 175 | 175 | 175 |
| Basis Weight (lbs/ream) | 27.7 | 27.7 | 28.2 | 27.3 |
| Number of elements per sq. in. | 0.633 | 26.9 | 52.7 | 107.5 |
| Emboss Penetration per Element | 0.064 | 0.029 | 0.029 | 0.032 |
| Ply bond strength in g/sq. in. of bond area | 284 | 2934 | 2273 | 2058 |
| Geometric Mean Tensile (g/3") | 743 | 716 | 713 | 741 |
| Roll Diameter (inches) | 4.66 | 4.54 | 4.52 | 4.47 |
| Roll Compression (%) | 17.6 | 15.2 | 14.3 | 19.0 |
| TMI Ply Bond (g) | 12.1 | 8.0 | 12.2 | 22.6 |
| SAT Capacity g/m$^2$ | 2117 | 1841 | 1814 | 1845 |
| SAT Rate g/s^0.5 | 0.53 | 0.40 | 0.34 | 0.38 |
| SAT Time sec | 164 | 213 | 262 | 264 |
| Sensory Softness | 18.8 | 19.0 | 18.8 | 18.7 |
| Bulk (caliper/basis weight) mils/8 plies//lb/R | 5.5 | 5.3 | 5.3 | 5.3 |
| GM Stretch (%) | 19.0 | 19.3 | 19.8 | 20.0 |
| GM Modulus g/% strain | 38.8 | 36.9 | 36 | 36.9 |
| Uniformity Ratio | 31.043 | 1.00 | 1.00 | 1.00 |

As can be seen from Table 1, the product produced in accordance with the present disclosure also exhibits an improvement in ply bond strength. The ply bond strength in g/in$^2$ of the present invention improved, for example, by 725% to 1000% when compared to the Quilted Northern product.

Example 2

Two ply paper products were produced using structured base sheets. The products were embossed with the pattern as shown in FIG. 5A and 5B and a less dense version of the same pattern.

As can be seen from Table 2, below, two-ply products according to the present invention exhibited significant improvements in bond strength, softness, and drape while maintaining the appearance of the base web.

TABLE 2

| Emboss pattern | Not Shown, but less dense than FIG. 5A | FIG. 5A and 5B | Current Commercial Pattern |
|---|---|---|---|
| maximum distance between elements | 0.386 | 0.286 | 1.22 |
| bond area in inches/sq. in | 0.00069 | 0.00125 | .04274 |
| bond strength: g/sq. in of bond area | 2649 | 2355 | 284 |
| elements/sq. in | 6.7 | 12.2 | 0.633 |
| elements/sq. cm | 1.04 | 1.89 | 0.098 |
| bond strength per element: g/element | 0.273 | 0.241 | 19 |

| | Products look identical | | |
|---|---|---|---|
| Product IDs | Not Shown | FIGs. 5A and 5B | Commercial Control |
| Sheet Count | 175 | 175 | 190 |
| Basis Weight (lbs/ream) | 26.2 | 26.3 | 27.6 |
| Calipher (mils/8 sheets) | 137 | 136 | 136 |
| MD Dry Tensile (g/3") | 1030 | 960 | 1051 |
| CD Dry Tensile (g/3") | 505 | 509 | 573 |
| Geometric Mean Tensile (g/3") | 721 | 699 | 776 |
| MD Stretch (%) | 24.4 | 23.7 | 26.1 |
| CD Stretch (%) | 11.4 | 11.1 | 9.8 |
| Perforation Tensile (g/3") | 471 | 476 | 405 |
| CD Wet Tensile (g/3") | 65 | 66 | 63 |
| Break Modulus (g/% strain) | 43.6 | 42.5 | 48.0 |
| MB 3100 Brightness (%) | 84 | 84 | 83 |
| MB 3100 b* | 5.3 | 5.4 | 6.2 |
| Opacity | 68 | 68 | 71 |
| Roll Diameter (inches) | 4.48 | 4.45 | 4.59 |
| Roll Compression (%) | 18.6 | 18.4 | 14.7 |
| TMI Ply Bond (g) | 1.8 | 2.9 | 6.9 |
| SAT Capacity g/m^2 | 1641 | 1679 | 1902 |
| SAT Rate g/s ^0.5 | 0.27 | 0.27 | 0.59 |
| SAT Time sec | 261 | 267 | 132 |
| Sensory Softness | 19.1 | 19.2 | 19.0 |
| black felt lint test unitless | 6.8 | 7.2 | 5.3 |
| wet abrasion mm^2 airborne lint count | 67.9 | 58.1 | 30.8 |
| finished product wet/dry ratio | 12.9% | 13.0% | 11.1% |
| Bulk (caliper/basis weight) mils/8 plies/lb/R | 5.2 | 5.2 | 4.9 |

TABLE 2-continued

| total tensiles | 1535 | 1469 | 1624 |
| GM Stretch | 16.7 | 16.2 | 16.0 |

As can be seen in Table 2, a product having on the order of 12 elements/sq. in. and a product having on the order of 7 elements/sq. in. has much less distance between the emboss elements resulting in more uniform ply bond. Further, the GM stretch is improved when the product was bound using the microembossing pattern as described herein.

Although the present disclosure has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive and the scope of the invention to be determined by any claims supportable by this application and the equivalents thereof, rather than by the foregoing description.

What is claimed is:

1. A multi-ply tissue product comprising;
   a first tissue ply comprising a pattern of microembossments having less than about 16 embossments per square inch, the microembossments each comprising a base and a tip;
   a second tissue ply bonded to the first tissue ply; and
   an adhesive applied to the tips of the microembossments and configured to achieve a bond area of less than about .0015 inches/sq. inch.

2. The multi-ply tissue product of claim 1, wherein the second tissue ply comprises a pattern of microembossments.

3. The multi-ply tissue product of claim 2, wherein the first and second tissue plies are bonded in a nested fashion.

4. The multi-ply tissue product of claim 2, wherein the first and second tissue plies are bonded in a tip-to-tip fashion.

5. The multi-ply tissue product of claim 1, wherein the second tissue ply is an unembossed ply.

6. The multi-ply tissue product of claim 1, wherein the product has a ply bond strength of at least about 1000 g/square inch of bond area.

7. The multi-ply tissue product of claim 1, wherein the product has a ply bond strength of at least about 2000 g/square inch of bond area.

8. The multi-ply tissue product of claim 1, wherein the product has a ply bond strength of at least about 2200 g/square inch of bond area.

9. The multi-ply tissue product of claim 1, wherein the product has a ply bond strength of at least about 2500 g/square inch of bond area.

10. The multi-ply tissue product of claim 2, wherein the product further comprises a third ply.

11. The multi-ply tissue product of claim 10, wherein the third ply is unembossed and is between the first and second plies.

12. The multi-ply tissue product of claim 1, wherein the product has a bond area of less than about 0.0013 inches/square inch.

13. The multi-ply tissue product of claim 1, wherein the product has a bond area of less than about 0.0012 inches/square inch.

14. The multi-ply tissue product of claim 1, further comprising a decorative emboss pattern on either the first or second tissue plies or on both tissue plies.

15. The multi-ply tissue product of claim 1, wherein the pattern of microembossments has a uniformity ratio of from about 1.0 to about 2.0.

16. The multi-ply tissue product of claim 1, wherein the microembossments are spaced from about 0.01 to about 0.4 inches apart.

17. The multi-ply tissue product of claim 1, wherein the microembossments are from about 0.014 to about 0.021 inches in diameter.

18. The multi-ply tissue product of claim 2, wherein the microembossments have a uniformity ratio of about 1.0 and are spaced from about 0.01 to about 0.4 inches apart, and the plies have a ply bond strength of at least about 1000 g/square inch of bond area.

19. The multi-ply tissue product of claim 1, wherein the first and second plies are both microembossed and a ply-bond strength of at least about 2000 g/square inch of bond area and both patterns of microembossments have a uniformity ratio of about 1.0.

* * * * *

UNITED STATES PATENT AND TRADEMARK OFFICE
CERTIFICATE OF CORRECTION

PATENT NO. : 10,654,244 B2
APPLICATION NO. : 15/696771
DATED : May 19, 2020
INVENTOR(S) : John H. Dwiggins It is certified that error appears in the above-identified patent and that said Letters Patent is hereby corrected as shown below:

On the Title Page

In the Abstract, Line 6, "inches/sq. inch" should read as --square inches/square inch--

In the Specification

Column 2, Line 53, "inches/sq. inch" should read as --square inches/square inch--

Column 3, Line 3, "inches per square/inch" should read as --square inches/square inch--

Column 3, Line 9, "inches/sq. inch" should read as --square inches/square inch--

Column 3, Lines 18-19, "inches per square/inch" should read as --square inches/square inch--

Column 8, Line 6, "inches per square inch" should read as --square inches/square inch--

Column 8, Line 7, "in/square inch" should read as --square inches/square inch--

Column 8, Line 8, "inches/square inch" should read as --square inches/square inch--

Column 8, Line 9, "inches/square inch" should read as --square inches/square inch--

Column 8, Line 10, "inches/square inch" should read as --square inches/square inch--

Column 8, Line 11, "inches/square inch" should read as --square inches/square inch--

Column 8, Line 12, "inches per square inch" should read as --square inches/square inch--

Column 8, Line 13, "inches/square inch" should read as --square inches/square inch--

Signed and Sealed this
Sixth Day of June, 2023

Katherine Kelly Vidal
*Director of the United States Patent and Trademark Office*

CERTIFICATE OF CORRECTION (continued)
U.S. Pat. No. 10,654,244 B2

Column 8, Line 14, "inches/square inch" should read as --square inches/square inch--

Column 14, Table 2, "bond area in inches/sq. in" should read as --bond area in square inches/square inch--

In the Claims

Claim 1, Line 34, "inches/sq. inch" should read as --square inches/square inch--

Claim 12, Lines 20-21, "inches/square inch" should read as --square inches/square inch--

Claim 13, Lines 23-24, "inches/square inch" should read as --square inches/square inch--